(12) United States Patent
Dangoor et al.

(10) Patent No.: US 12,333,557 B2
(45) Date of Patent: Jun. 17, 2025

(54) AUTOMATIC USER INTERFACE CUSTOMIZATION BASED ON MACHINE LEARNING PROCESSING

(71) Applicant: INTUIT INC., Mountain View, CA (US)

(72) Inventors: Sheer Dangoor, Tel Aviv (IL); Ido Meir Mintz, Tel Aviv (IL); Daniel Ben David, Tel Aviv (IL); Alexander Zhicharevich, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 266 days.

(21) Appl. No.: 17/512,580

(22) Filed: Oct. 27, 2021

(65) Prior Publication Data

US 2023/0129557 A1    Apr. 27, 2023

(51) Int. Cl.
| | |
|---|---|
| *G06Q 30/0201* | (2023.01) |
| *G06F 3/0482* | (2013.01) |
| *G06Q 30/04* | (2012.01) |
| *G06Q 40/12* | (2023.01) |
| *H04L 67/306* | (2022.01) |

(52) U.S. Cl.
CPC ....... *G06Q 30/0201* (2013.01); *G06F 3/0482* (2013.01); *G06Q 30/04* (2013.01); *H04L 67/306* (2013.01); *G06Q 40/12* (2013.12)

(58) Field of Classification Search
CPC .......................... G06Q 30/0201; G06F 3/0482
See application file for complete search history.

(56) References Cited

U.S. PATENT DOCUMENTS

| | | | | |
|---|---|---|---|---|
| 2013/0106894 | A1* | 5/2013 | Davis | G06F 16/434 345/589 |
| 2016/0085430 | A1* | 3/2016 | Moran | H04M 1/72454 715/765 |
| 2016/0196587 | A1* | 7/2016 | Eder | G06Q 30/0271 705/14.49 |
| 2019/0109807 | A1* | 4/2019 | Derbanne | H04L 51/214 |
| 2020/0311568 | A1* | 10/2020 | Xue | G06N 20/00 |
| 2021/0141497 | A1* | 5/2021 | Magureanu | G06F 9/451 |
| 2021/0141498 | A1* | 5/2021 | Magureanu | G06F 9/451 |
| 2021/0141619 | A1* | 5/2021 | Magureanu | G06F 8/34 |
| 2021/0141620 | A1* | 5/2021 | Magureanu | G06F 8/35 |
| 2021/0141652 | A1* | 5/2021 | Magureanu | G06F 3/0482 |
| 2022/0171874 | A1* | 6/2022 | Lundbæk | G06F 21/6254 |

OTHER PUBLICATIONS

Constantine, Larry L., and Lucy AD Lockwood. "Structure and style in use cases for user interface design." Object modeling and user interface design (2001): 245-280. (Year: 2001).*

Vu, Bao. "The design and implementation of web based expense tracking application." (2013). (Year: 2013).*

* cited by examiner

*Primary Examiner* — Andre D Boyce
(74) *Attorney, Agent, or Firm* — DLA PIPER LLP US

(57) ABSTRACT

A processor may receive a request to display a user interface (UI) for a user account. The processor may determine a context for the UI from information specific to the user account. The processor may select one of a plurality of UI elements based on the determining. In some embodiments, the selecting may include evaluating a value function taking the information specific to the user account and information about the context as inputs. The processor may cause the UI including the selected one of the plurality of UI elements to be displayed in response to the request.

17 Claims, 6 Drawing Sheets

FIG. 5

Invoice no. 1014

500

Customer

Customer email

Accept Card Payments with PayPal
Set up Direct Debit with GoCardless

502

Getting paid using QB will cost you only $2 for this invoice

Billing Address

Terms: Net 30

Invoice Date: 01/09/2021

Due Date: 01/10/2021

Tags

| # | Product/Service | Description |
|---|---|---|
| 1 | | |
| 2 | | |

Add Lines | Clear All Lines | Add Subtotal

Message on invoice

Message on statement

Attachments    Maximum size: 20MB

AUTOMATIC USER INTERFACE CUSTOMIZATION BASED ON MACHINE LEARNING PROCESSING

BACKGROUND

User interfaces (UIs) are a part of most consumer-facing software. Many software products, whether stand-alone or accessed through a web browser or the like, are accessed by a variety of users in a variety of contexts. However, it is often the case that a UI will present the same information and/or options to all users regardless of context. This is especially true in portions of the UI that are encountered first, such as overview pages presented shortly after a user logs in to an account or launches a program. One example is an accounting software UI accessed by thousands of users or more each day, each of whom may have widely varying needs for accounting software functionality, who may have to enter multiple commands into the UI to get what they need, sometimes in a way that is not immediately apparent.

BRIEF DESCRIPTIONS OF THE DRAWINGS

FIG. 5 shows an example UI according to some embodiments of the disclosure.

DETAILED DESCRIPTION OF SEVERAL EMBODIMENTS

Embodiments described herein automatically customize a UI to provide information and/or interactive elements that are likely to be useful in a determined or predicted context in which the UI is being used. Customization may be performed using one or more machine learning (ML) models that employ multi-stage online learning to maximize value functions. By selecting UI elements that attempt to maximize the value for a given context, disclosed embodiments can automatically present relevant UI elements even before a user has started working in the UI (e.g., at a launch screen or landing page). The disclosed embodiments thereby provide the technical advantage of automatically customizing UIs for contexts that can be as granular as an individual user level, reducing the overhead requirements for storing certain user profile information or large sets of saved customized UIs, and addressing customization problems unique to the computer UI space, among other advantages.

For example, users such as small business owners frequently employ accounting software to create invoices, collect payments, track payments, and perform other payment-related functions. Getting paid is one of the most important problems such users may face, but many users may be unaware that they can generate pay-enabled electronic invoices within the accounting software. Embodiments described herein can personalize UI campaigns to increase the use of pay-enabled invoices that are known for getting users paid faster. For example, a personalized UI element may be included in an overview page that is shown upon login, and clicking on this element may take the user to a pay enabled invoice setup feature. Personalization of the UI element may be accomplished by a multi-stage online learning process that can start by launching a campaign experiment with ten different alternatives utilizing different value propositions presented in the UI element (e.g., get paid faster, transact payments at a lower price, save paper, keep everything in one place, and effort simplification; for each alternative, embodiments may use both positive and negative framings). Then, as described in detail below, a merchant-gain context may be evaluated using attributes for the merchant value proposition. An ML optimization oracle using LR/ANN, contextual bandit, or other models may optimize over time to produce a policy that selects the most appropriate UI presentations for new customers to drive them to send pay enabled invoices. Note that while the accounting software example is used herein to illustrate the features and functionality of various automatic UI customization embodiments, it will be apparent that the systems and methods described herein are not limited to accounting software.

Figure 1:
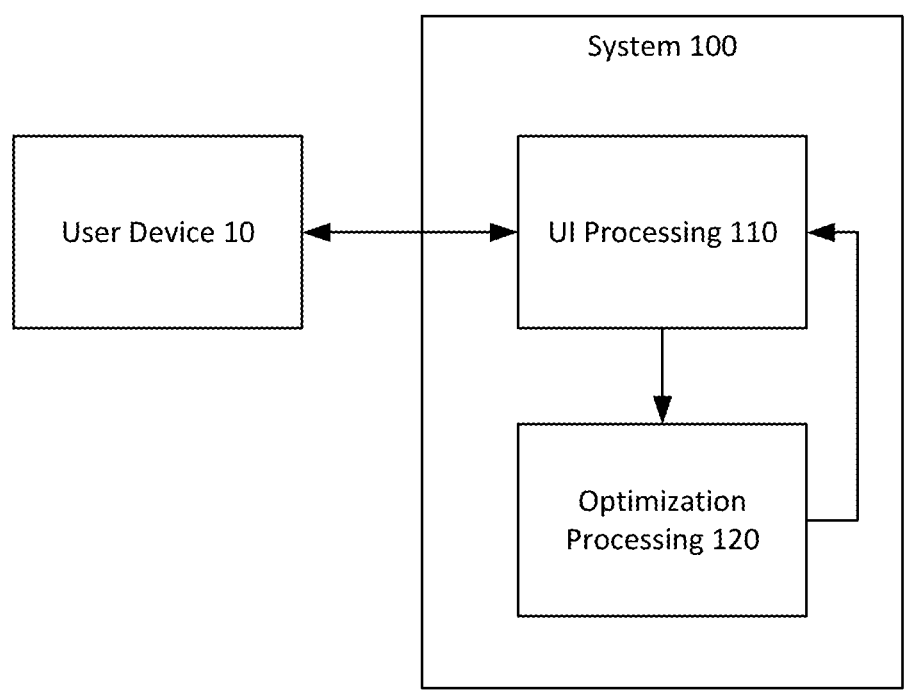
FIG. 1 shows an example UI customization system according to some embodiments of the disclosure.

FIG. 1 shows an example UI customization system 100 according to some embodiments of the disclosure. System 100 may include a variety of hardware, firmware, and/or software components that interact with one another and with one or more user device(s) 10, each of which may be implemented by one or more computers (e.g., as described below with respect to FIG. 6). As described in detail below, user device 10 can request display of a UI from system 100, for example in connection with an act of logging into an online account or app. In some embodiments, user device 10 and system 100 may be in communication through one or more networks such as the Internet. In some embodiments, many user devices 10 and/or many user accounts may be used to access system 100. As described below, system 100 can respond to the request by customizing the UI that is shown on a display of user device 10, for example through the use of UI processing 110 and optimization processing 120. FIGS. 2-5 illustrate the functioning of system 100, including UI processing 110 and optimization processing 120, in detail.

User device 10, system 100, and individual elements of system 100 (UI processing 110 and optimization processing 120) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while UI processing 110 and optimization processing 120 are depicted separately, any combination of these elements may be part of a combined hardware, firmware, and/or software element. Moreover, while one user device 10 is shown, in practice, there may be multiple user devices 10 and/or multiple users (each with their own account(s)) may share a user device 10.

Figure 2:
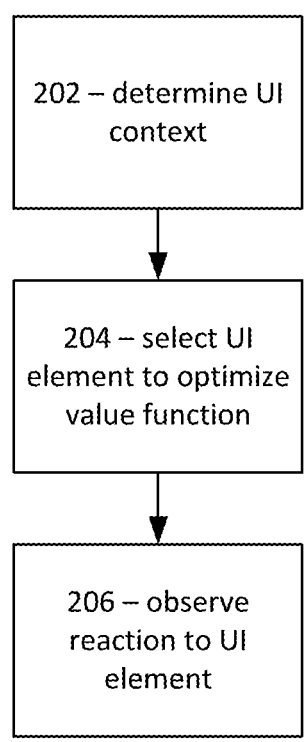
FIG. 2 shows an example UI customization process according to some embodiments of the disclosure.
Figure 3:
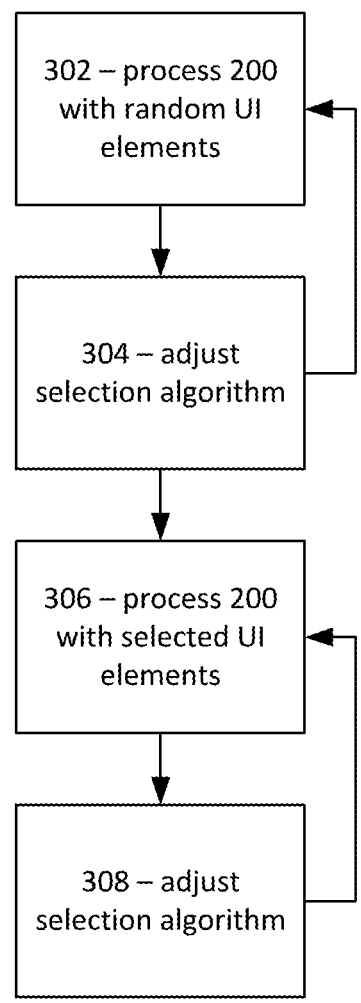
FIG. 3 shows an example UI customization training process according to some embodiments of the disclosure.
Figure 4:
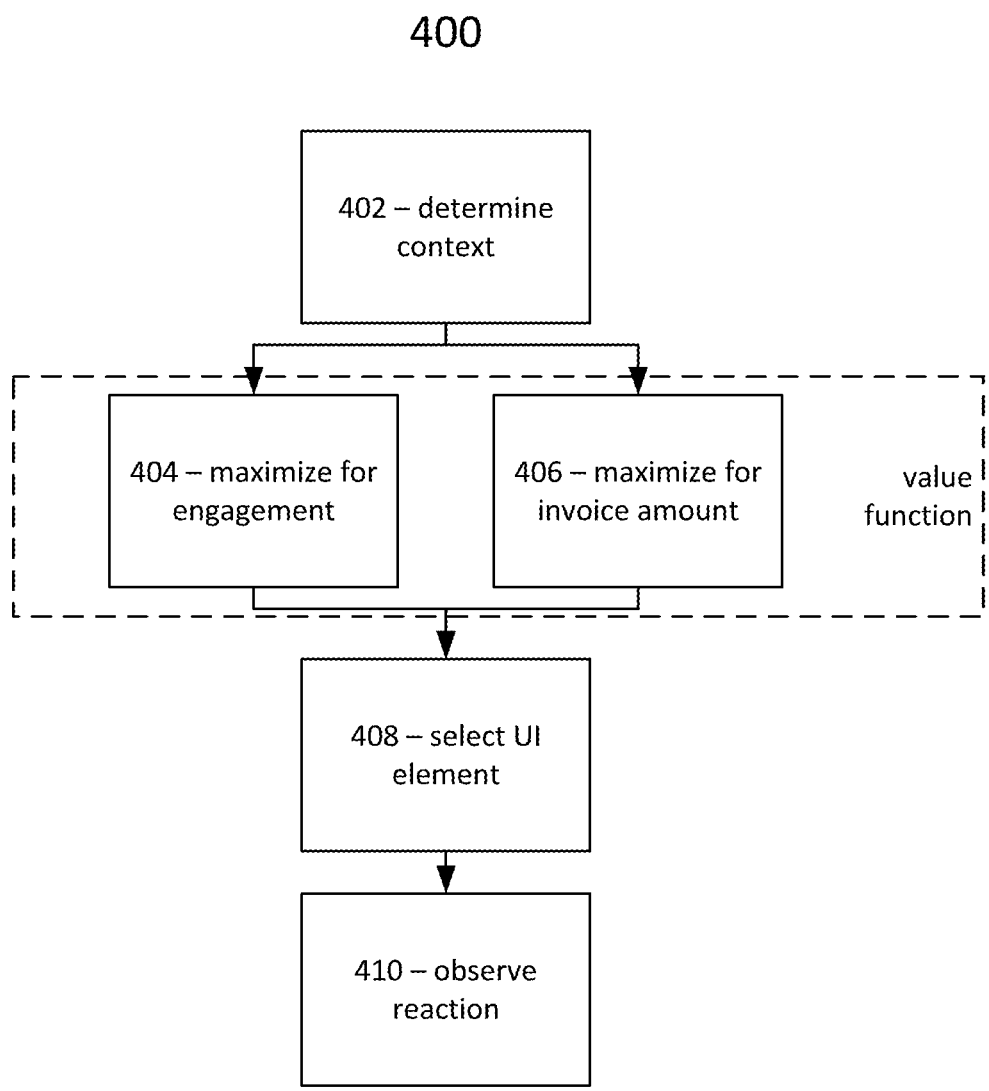
FIG. 4 shows an example UI customization for invoice UI elements process according to some embodiments of the disclosure.

FIG. 2 shows an example UI customization process 200 according to some embodiments of the disclosure. System 100 can perform process 200 when a UI having context-dependent content is to be displayed, such as when system 100 has received a request to display a UI for a user account from user device 10. As described in detail below with respect to FIGS. 3 and 4, each time the UI customization process 200 is performed, the user's reaction can be used to refine the algorithm for selecting the UI element that is displayed. FIG. 2 explains a single instance of the process in isolation, while FIG. 3 shows how the selection algorithm learns, and FIGS. 4 and 5 provide a specific example in the context of accounting software. Continuing the non-limiting accounting software example, system 100 can perform process 200 after a user logs in and is about to see a general UI.

At 202, system 100 can determine a context for the UI from information specific to the user account and/or other information. For example, this may include determining at least one attribute of the user and/or other attributes. User attributes may define the context, and may include data such as industry, location (e.g., state, zip code), financial situation, past invoice records, etc. Data specific to a particular user session may also define the context, such as location of login (location of user device 10), one or more characteristics of user device 10, time of login, etc. System 100 (e.g., UI processing 110) can retrieve stored information about the user account and/or determine the information about the session from the login request, for example.

At 204, system 100 can select one of the plurality of UI elements available for display based on the determining performed at 202. The selecting may include respectively determining at least one characteristic of each of a plurality of UI elements available for display and/or optimizing a value function for the information specific to the user account. System 100 can evaluate the value function taking the information specific to the user account and information about the context as inputs, as described in detail below. For example, there can be several interchangeable UI elements (e.g., interchangeable text strings, graphics, interactive features, etc.) stored in a memory accessible to system 100 (e.g., UI processing 110). System 100 can evaluate a value function using the context determined at 202 to obtain a result, and select the UI element from the memory having a score that corresponds best to the result. The UI element score that corresponds best may be, for example, a score for a UI element that has been observed to be most likely to be interacted with in the same context or similar contexts to the context determined at 202. This is described in detail below. In some cases, the selection may be a random selection, such as when not enough information is available to optimize the value function.

At 206, system 100 can observe a reaction to the UI element by the user. For example, system 100 can cause the UI including the selected one of the plurality of UI elements to be displayed in response to the request, and the user may interact with the UI element (e.g., clicking it or otherwise selecting it) or not. If the user interacts with the UI element, system 100 may record this as a reward for the value function, and if not (e.g., clicking on something else, timing out, etc.), system 100 may record this as no reward for the value function, as described in detail below. As such, a score for the UI element used for selection at 204 can be adjusted.

In addition to observing the reaction, if the user selects the UI element, system 100 and/or another system (e.g., an underlying accounting software system of which system 100 is a component) can perform actions related to the UI element. That is, system 100 and/or another system can receive a command issued through the selected one of the plurality of UI elements, and, in response to receiving the command, performing processing associated with the UI element. In some examples described in greater detail below, such processing may be associated with pay-enabled invoice functionality, for example.

FIG. 3 shows an example UI customization training process 300 according to some embodiments of the disclosure. System 100 can perform process 300 over time to tune an algorithm used to select UI elements in process 200. Every time system 100 performs process 200, the outcome (e.g., the reaction observed at 206) can feed into process 300 as described below. In some embodiments, the system 100 may handle millions of logins a day, or some other large volume, enabling it to train very quickly without requiring a supervised or unsupervised offline training session. This provides the advantage of real-time updates as user preferences or other context drivers change over time as well as reducing overhead and downtime issues involved with training processing and storing training data.

At 302, system 100 (e.g., UI processing 110) can perform process 200 to select a UI element and insert it into a UI by selecting a random UI element at 204. This phase of process 300 may occur early, before a great deal of user interactions have taken place, and the corresponding interactions to the displayed UI elements have been observed.

At 304, system 100 (e.g., optimization processing 120) can determine a response to the UI element presented at 302 and adjust the selection algorithm used to select UI elements accordingly. The response can be an interaction with the selected one of the plurality of UI elements (e.g., a click on the UI element or other selection of the UI element) or an ignoring of the selected one of the plurality of UI elements (e.g., clicking or selecting a different UI element, timing out, etc.). The adjusting can cause the randomly-selected one of the plurality of UI elements to be more likely selected for the context in the future in response to the interaction, or the adjusting can cause the randomly-selected one of the plurality of UI elements to be less likely selected for the context in the future in response to the ignoring. That is, if an interaction took place, the score for the UI element that was shown can be rewarded and increased for the context in which the interaction took place. Alternatively, if the user ignored the UI element, the score for the UI element and context can be maintained the same or decreased.

For example, optimization processing 120 can include the above-referenced ML optimization oracle using LR/ANN, contextual bandit, or other models that may optimize over time to produce a policy that selects the most appropriate UI presentations. The optimizing (e.g., the adjustment of the selection algorithm) may proceed as follows in some embodiments. First, the data observed through process 200 may be obtained. System 100 can compute a distribution P(t) over the actions using the ML model. For example, a contextual bandit may be used to model a distribution of rewards by standard contextual bandit processing. The distribution may be a set of policies. Then, system 100 can select action (or policy) a(t) from the set P(t) and collect the reward R(t) for this action as specified. Based on the reward (e.g., positive or negative depending on how the user interacted), system 100 may update the distribution P(t) probabilities.

Processing at 302 and 304 can be repeated as users interact with system 100 and random UI elements are served by system 100 for display at user device 10. Eventually, when a user logs in and the context of the interaction is the same as or similar to a previously encountered context from a previous iteration of processing at 302, the previously recorded score for that iteration from processing at 304 can be leveraged.

At 306, system 100 (e.g., UI processing 110) can perform process 200 to select a UI element and insert it into a UI by selecting a UI element having a high score for the current context, as described above.

At 308, system 100 (e.g., optimization processing 120) can determine a response to the UI element presented at 306 and adjust the selection algorithm used to select UI elements accordingly. As with the processing at 304, the response can be an interaction with the selected one of the plurality of UI elements (e.g., a click on the UI element or other selection of the UI element) or an ignoring of the selected one of the plurality of UI elements (e.g., clicking or selecting a different UI element, timing out, etc.). The adjusting can cause the selected one of the plurality of UI elements to be more likely selected for the context in the future in response to the interaction, or the adjusting can cause the randomly-selected one of the plurality of UI elements to be less likely selected for the context in the future in response to the ignoring. That is, if an interaction took place, the score for the UI element that was shown can be rewarded and increased for the context in which the interaction took place. Alternatively, if the user ignored the UI element, the score for the UI element and context can be maintained the same or decreased. Note that this can take place even though the UI element has previously been scored for the context. This is an example of reinforcement learning, where as more interactions are observed, more data is gathered, and scores are improved accordingly to become more accurate over time. Specific examples of such reinforcement learning algorithms are described in detail below with respect to FIGS. 4 and 5.

FIG. 4 shows an example UI customization for invoice UI elements process 400 according to some embodiments of the disclosure. This process 400 may be regarded as a specific case of process 200, where system 100 is presenting UI elements that are intended to drive users of accounting software to a pay enabled invoice interface (e.g., see FIG. 5).

At 402, system 100 can determine a context for the UI from information specific to the user account and/or other information. For example, this may include determining at least one attribute of the user and/or other attributes. User attributes may define the context, and may include data such as industry, location (e.g., state, zip code), financial situation, past invoice records, etc. Data specific to a particular user session may also define the context, such as location of login (location of user device 10), one or more characteristics of user device 10, time of login, etc. System 100 can retrieve stored information about the user account and/or determine the information about the session from the login request, for example.

At 404 and 406, system 100 can evaluate a value function. The goal may be to optimize a value function that combines two levels of rewards: (1) Engagement—Getting into the invoicing screen for exploration; (2) Actual pay enabled invoice created. In some embodiments, the value function may include the following:

$$V=1/n\Sigma(\delta Rengagement(\pi(xi))+(1-\delta)Rpayenabledamount(\pi(xi))), \text{ where}$$

V is an estimated value using a policy π for context x;
δ is a balance ratio between an engagement and a pay enabled invoice amount sent;
π is the policy under evaluation;
xi is the context of the user i;
Rengagement is a reward for an interaction with the UI element;
Rpayenabledamount is a reward for an amount of a pay enabled invoice generated after the interaction with the UI element; and
n is a number of observations of the policy π.

As shown in FIG. 4, this value function maximizes for engagement 404 and maximized for invoice amount 406 simultaneously, thereby taking into account both the command issued by the user and the processing associated with pay-enabled invoice functionality. That is, a positive reaction to a UI element will be maximized at 404, and an amount of the pay enabled invoice generated as a result of the positive reaction and subsequent processing will be maximized at 406. Thus, not only interactions but also successful uses will be maximized, with more important uses (as evidenced by higher invoice values) receiving higher scores than less important uses (as evidenced by lower invoice values).

At 408, system 100 can select a UI element that has a score corresponding to the outcome of value function maximization. For example, there may be 10 different "banner" alternatives stored in a memory accessible to system 100 that include different value propositions and framings for pay-enabled invoicing. There may also be a context layer that includes attributes and interactions of user-invoice-banner characteristics. This can include, for example, user mean indicators: payenabled_invoicing_ind, industry_invoice_payment_time, industry_invoice_payment_cost, industry_invoice_payment_money_gain, repeated customers, industry_invoice_payment_checks, total_sales_amount, frequent_invoicing_terms, location, invoicing_frequent_days_in_month. As in 304 (described above), system 100 can use one of the targeted models to optimize the right "banner" based on the context. Optimization processing 120 may optimize its policy to maximize the value function given above, for example.

At 410, system 100 can observe a reaction to the UI element by the user. For example, system 100 can cause the UI including the selected one of the plurality of UI elements to be displayed in response to the request, and the user may interact with the UI element (e.g., clicking it or otherwise selecting it) or not. If the user interacts with the UI element, system 100 may record this as a reward for the value function, and if not (e.g., clicking on something else, timing out, etc.), system 100 may record this as no reward for the value function, facilitating adjustment as described above with respect to FIG. 3.

FIG. 5 shows an example UI 500 according to some embodiments of the disclosure. This is an accounting software UI showing a general view of an invoice that is being prepared by a user. This invoice does not have electronic pay-enabled features included. As described in process 400 of FIG. 4, system 100 can select a UI element 502 to suggest to the user that they can pay enable the invoice. In this example, after performing process 400, system 100 has selected a message indicating that "Getting paid using QB (the accounting software) will cost you only $2 for this invoice." For example, system 100 has determined, based on the context of the user and interaction, that a message of getting paid at a lower price would be most likely to entice the user to click on the UI element 502 and start the pay enabling process. This message may have been selected from one of a plurality of messages such as, for example, "Get paid faster—getting paid using QB speed up days to paid by X days," Get paid at a lower price—getting paid using QB will cost you only $Y for this invoice," QB is worthwhile—"QB charges the lowest acquiring rate among all other online solutions in your transaction category," Save checks—"ACH transfers eliminate the need to handle paper checks or cash," Everything in one place—"getting paid using QB takes care of all reconciliation and accounting aspects," Negative—"avoid losing $Z on transactions fees by using QB." If the user clicks on UI element 502, system 100 can register a positive score for the selected UI element 502. If the user performs other tasks in UI 500 without interacting with UI element 502, system 100 can register a negative score for the selected UI element 502.

Figure 6:
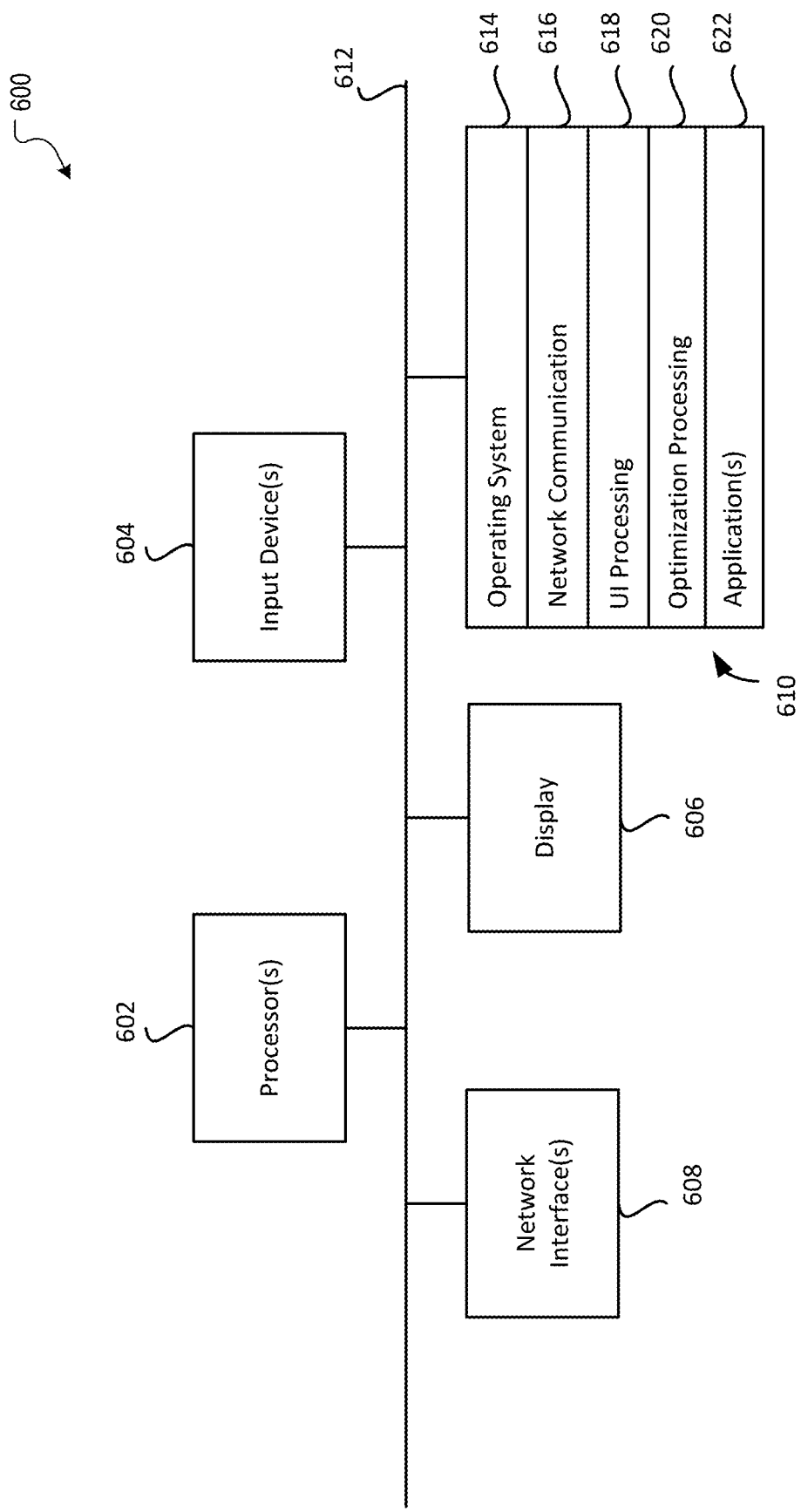
FIG. 6 shows a computing device according to some embodiments of the disclosure.

FIG. 6 shows a computing device 600 according to some embodiments of the disclosure. For example, computing device 600 may function as system 100 or any portion(s) thereof, or multiple computing devices 600 may function as system 100.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

UI processing 618 may include the system elements and/or the instructions that enable computing device 600 to perform the UI processing 110 of system 100 as described above. Optimization processing 620 may include the system elements and/or the instructions that enable computing device 600 to perform the optimization processing 120 of system 100 as described above. Application(s) 622 may be an application that uses or implements the outcome of processes described herein and/or other processes. For example, application(s) 622 may use data generated as described above, for example by displaying in a UI and/or for performing additional processing in other services and/or apps. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. To give a specific example, alternate embodiments could create labels and do supervised learning in an offline setting rather than the process 300 of FIG. 3, with the caveat that offline training must be done repeatedly as things change and is not continuously learning. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a processor, a request to login to an application configured to display a user interface (UI) for a user account subsequent to login;
   determining, by the processor, a context for the UI from information specific to the user account including at least one of:
      at least one attribute of the user defined in a previous session of the user account, and
      at least one characteristic of a session defined in the request to login;
   selecting, by the processor, one of a plurality of UI elements based on the determining, the selecting optimizing a value function for the information specific to the user account, the optimizing including optimizing engagement as a function of the context and optimizing an amount of a pay enabled invoice generated through application activity as a function of the context, wherein the value function includes the following: $V=1/n\Sigma(\delta \text{Rengagement}(\pi(xi))+ (1-\delta)\text{Rpayenabledamount}(\pi(xi)))$; where
      V is an estimated value using a policy IT for context x,
      $\delta$ is a balance ratio between an engagement and a pay enabled invoice amount sent,
      $\pi$ is the policy under evaluation,
      xi is the context of the user I,
      Rengagement is a reward for an interaction with the UI element,
      Rpayenabledamount is a reward for an amount of a pay enabled invoice generated after the interaction with the UI element, and
      n is a number of observations of the policy $\pi$;
   causing, by the processor, login to the user account in response to the request; and
   causing, by the processor, the UI including the selected one of the plurality of UI elements to be displayed upon login.

2. The method of claim 1, wherein the determining includes determining the at least one attribute of the user.

3. The method of claim 1, wherein the selecting includes respectively determining at least one characteristic of each of the plurality of UI elements.

4. The method of claim 1, wherein the selecting includes randomly selecting the selected one of the plurality of UI elements, the method further comprising:
   determining, by the processor, a response to the selected one of the plurality of UI elements by the user, the response comprising an interaction with the selected one of the plurality of UI elements or an ignoring of the selected one of the plurality of UI elements; and
   adjusting, by the processor, a selection algorithm based on the response, wherein the adjusting causes the randomly-selected one of the plurality of UI elements to be more likely selected for the context in the future in response to the interaction or the adjusting causes the randomly-selected one of the plurality of UI elements to be less likely selected for the context in the future in response to the ignoring.

5. A method comprising:
   performing the method of claim 4 a plurality of times for a plurality of different users, wherein the adjusting is applied to the same selection algorithm each time; and
   storing, by the processor, the adjusted selection algorithm.

6. The method of claim 5, wherein the selecting comprises applying the stored algorithm to optimize a value function for the information specific to the user account.

7. The method of claim 1, further comprising:
   receiving, by the processor, a command issued through the selected one of the plurality of UI elements; and
   in response to receiving the command, performing processing associated with pay-enabled invoice functionality.

8. A system comprising:
   a processor; and
   a non-transitory memory storing instructions that, when executed by the processor, cause the processor to perform processing comprising:
      receiving a request to login to an application configured to display a user interface (UI) for a user account subsequent to login;

determining a context for the UI from information specific to the user account including at least one of:
  at least one attribute of the user defined in a previous session of the user account, and
  at least one characteristic of a session defined in the request to login;
selecting one of a plurality of UI elements based on the determining, the selecting optimizing a value function for the information specific to the user account, the optimizing including optimizing engagement as a function of the context and optimizing an amount of a pay enabled invoice generated through application activity as a function of the context, wherein the value function includes the following: $V = 1/n \Sigma (\delta R engagement(\pi(x_i)) + (1-\delta) R payenabledamount(\pi(x_i)))$; where
  V is an estimated value using a policy TT for context x,
  $\delta$ is a balance ratio between an engagement and a pay enabled invoice amount sent,
  $\pi$ is the policy under evaluation,
  $x_i$ is the context of the user I,
  Rengagement is a reward for an interaction with the UI element,
  Rpayenabledamount is a reward for an amount of a pay enabled invoice generated after the interaction with the UI element, and
  n is a number of observations of the policy TT;
causing login to the user account in response to the request; and
causing the UI including the selected one of the plurality of UI elements to be displayed upon login.

9. The system of claim 8, wherein the determining includes determining the at least one attribute of the user.

10. The system of claim 8, wherein the selecting includes respectively determining at least one characteristic of each of the plurality of UI elements.

11. The system of claim 8, wherein:
the selecting includes randomly selecting the selected one of the plurality of UI elements; and
the processing further comprises:
  determining a response to the selected one of the plurality of UI elements by the user, the response comprising an interaction with the selected one of the plurality of UI elements or an ignoring of the selected one of the plurality of UI elements;
  adjusting a selection algorithm based on the response, wherein the adjusting causes the randomly-selected one of the plurality of UI elements to be more likely selected for the context in the future in response to the interaction or the adjusting causes the randomly-selected one of the plurality of UI elements to be less likely selected for the context in the future in response to the ignoring; and
  storing the adjusted selection algorithm in the memory.

12. The system of claim 11, wherein the processing further comprises performing the processing a plurality of times for a plurality of different users, wherein the adjusting is applied to the same selection algorithm each time.

13. The system of claim 12, wherein the selecting comprises applying the stored algorithm to optimize a value function for the information specific to the user account.

14. The system of claim 8, wherein the processing further comprises:
receiving a command issued through the selected one of the plurality of UI elements; and
in response to receiving the command, performing processing associated with pay-enabled invoice functionality.

15. A method comprising:
receiving, by a processor, a request to login to an application configured to display a user interface (UI) for a user account subsequent to login;
determining, by the processor, a context for the UI from information specific to the user account including at least one of:
  at least one attribute of the user defined in a previous session of the user account, and
  at least one characteristic of a session defined in the request to login;
selecting, by the processor, one of a plurality of UI elements, the selecting including evaluating a value function taking the information specific to the user account and information about the context as inputs, the optimizing selecting including optimizing engagement as a function of the context and optimizing an amount of a pay enabled invoice generated through application activity as a function of the context, wherein the value function includes the following: $V = 1/n \Sigma (\delta R engagement(\pi(x_i)) + (1-\delta) R payenabledamount(\pi(x_i)))$; where
  V is an estimated value using a policy IT for context x,
  $\delta$ is a balance ratio between an engagement and a pay enabled invoice amount sent,
  $\pi$ is the policy under evaluation,
  $x_i$ is the context of the user I,
  Rengagement is a reward for an interaction with the UI element,
  Rpayenabledamount is a reward for an amount of a pay enabled invoice generated after the interaction with the UI element, and
  n is a number of observations of the policy TI;
causing, by the processor, login to the user account in response to the request; and
causing, by the processor, the UI including the selected one of the plurality of UI elements to be displayed upon login.

16. The method of claim 15, further comprising:
receiving, by the processor, a command issued through the selected one of the plurality of UI elements; and
in response to receiving the command, performing processing associated with pay-enabled invoice functionality.

17. The method of claim 16, wherein future evaluations of the value function take into account the command and the processing associated with pay-enabled invoice functionality.

* * * * *